United States Patent Office 3,347,886
Patented Oct. 17, 1967

3,347,886
PROCESSES FOR REMOVING THE HALPHEN-TEST RESPONSE FROM REFINED AND BLEACHED COTTONSEED OIL
Eric T. Rayner, New Orleans, Paul H. Eaves, Metairie, and Harold P. Dupuy, New Orleans, La., assignors to the United States of America as represented by the Secretary of Agriculture
No drawing. Filed July 11, 1966, Ser. No. 564,007
2 Claims. (Cl. 260—424)

ABSTRACT OF THE DISCLOSURE

A process for removing positive Halphen-test response from a refined and bleached cottonseed oil containing cyclopropenoids (as malvalic acid), which comprises heating and steam sparging the cottonseed oil at a temperature of about from 400° to 500° F. and at a reduced pressure of at least about 100 mm. of mercury until the Halphen response becomes negative.

A non-exclusive, irrevocable, royalty-free license in the invention herein described, throughout the world for all purposes of the United States Government, with the power to grant sublicenses for such purpose, is hereby granted to the Government of the United States of America.

This invention relates to industrially practical processes for removing the Halphen-test response from refined and bleached cottonseed oil and has as its object the production of cottonseed oils that react negatively to the Halphen test.

Cottonseed oil, in addition to the major fatty acids constituents is reported to contain from a fraction of one percent to about two percent of cyclopropenoids as (malvalic acid). Malvalic acid reacts positively to the so-called Halphen test. Cottonseed oil also reacts positively to the Halphen test as do the seed oils of many malvaceous plants.

It is known that acids containing the cyclopropenoid ring (i.e., malvalic and sterculic acids), when included in the rations of laying hens, are capable of producing certain abnormalities, such as pink egg whites; salmon colored, enlarged, fluid yolks; and reduced hatchability, F. L. Carter and V. L. Frampton, Chemical Reviews, 64, 497–521 (1964), and R. A. Phelps, F. S. Shenstone, A. R. Kemmerer, and R. J. Evans, Poultry Science, 44, 358–394 (1965). In addition, it has been reported that a correlation exists between the intensity of the Halphen test as applied to the residual oil in the cottonseed meal component of a poultry ration and the occurrence of abnormalities in stored intact eggs.

It has also been reported in the literature that conventional processes for refining, bleaching, and deodorizing cottonseed oils, result in disparate reductions of cyclopropenoid content, varying in a range from about 0.42 to 0.4% cyclopropenoid (calculated as malvalic acid) content, Harris, J. A., F. C. Magne, and E. L. Skau, Journal American Oil Chemists' Society, 41, 309–311 (1964) depending on the processing conditions. Such concentrations of malvalic acid in the finished oil are known to elicit a positive Halphen-test response.

Prolonged heating of cottonseed oil in the presence of air has been reported to eliminate the Halphen-test response, but this is not practical for cottonseed oil, the intended end use for which is an edible use, since prolonged heating of vegetable oils in the presence of air is capable of producing toxic polymers.

Certain halogen-containing mineral acids are also reported to effect a reduction in or the destruction of the Halphen-test response, but the addition of such extraneous halogenated materials to cyclopropenoid-containing edible oils, is per se, most undesirable.

In a previous patent application Serial No. 327,560, filed December 2, 1963, and in the literature, E. T. Rayner, L. E. Brown, and H. P. Dupuy, Journal American Oil Chemists' Society, 43, 113–15 (1966), we have shown that elimination of the Halphen-test response and its attendant unusual biological effects can be achieved in the laboratory by treating a previously alkali refined oil with certain monobasic fatty acids of vegetable origin, such as capric acid or cottonseed fatty acids, and employing therewith a temperature of up to 235° C. for an interval of about two hours. This heat treatment, conducted under an inert atmosphere, followed by conventional deodorization for one hour, produces an odorless, light-colored oil, completely devoid of the Halphen-test response, and having an acidity lower than the original alkali-refined cottonseed oil used as starting material.

This process, however, while potentially adaptable for commercial use, nevertheless requires the use of an inert cover gas which in most instances is not a part of conventional deodorization processing equipment. This disadvantage, though slight, is completely obviated by the processes here proposed. In addition, two of the three processes described below do not require free fatty acid supplementations.

In general, the processes of our invention which we use to eliminate the Halphen-test response from cottonseed oils are typically characterized in the following three operations:

(1) Halphen-positive, refined and bleached cottonseed oil of known cyclopropene acid content, as determined by step-wise HBr titration, J. A. Harris, F. C. Magne, and E. L. Skau, Journal American Oil Chemists' Society, 41, 309–311 (1964), is supplemented with a slight excess of the stoichiometric quantity of cottonseed fatty acids required (typically about from 0.2% to 2.0%) to react with the cyclopropenoid acids present. The mixture then is heated and steam sparged in a batch-type, pilot-plant deodorizer to conventional deodorizing temperatures, preferably about from 400° to 500° F. under moderately reduced absolute pressure, preferably 100 mm. of mercury or more. The pressure is so regulated throughout the procedure so as to prevent volatilization or appreciable loss of the supplementary fatty acids present in the oil mixture. Thus the free fatty acids contained in the oil are available throughout the heating process to effect with dispatch, complete elimination of the Halphen-test response. Sample aliquots of oil are withdrawn at intervals during the heating process and analyzed for the Halphen-test response, AOCS Official Method Cb 1–25 "Official and Tentative Methods of Analysis," 2nd. rev. to 1963, Chicago, to establish when the oil has been rendered Halphen negative. The Halphen-negative oil thus produced may then be readily deodorized in a conventional manner in the existing equipment, to remove remaining odors and flavors, and to reduce acidity of the finished oil to below that of the original refined, bleached oil used as starting material.

(2) Halphen positive, refined and bleached cottonseed oil is heated to conventional deodorizing temperatures, preferably about from 400° to 500° F., in a batch-type pilot-plant deodorizer, and steam sparged under a moderately reduced pressure, preferably 100 mm. of mercury or more, in such manner as to produce from the oil being treated, and to retain within such oil, sufficient free fatty acids to react with the cyclopropene components of the oil, and thus render it Halphen negative. Thus, the free fatty acids inherently part of the oil being processed, are made available in sufficient quantity during the operation to effect complete elimination of the Halphen-test response. Sample aliquots of oil are withdrawn at intervals during the heating process and analyzed for the Halphen-test response, AOCS Official Method Cb 1-25, "Official and Tentative Methods of Analysis," 2nd. rev. to 1963, Chicago, to establish when the oil has been rendered Halphen negative. Such Halphen-negative cottonseed oil is then readily deodorized in the existing equipment by conventional deodorization procedures to remove remaining odors and flavors, and to reduce acidity of the finished oil to below that of the original refined, bleached oil used as starting material.

The phenomenon of fatty acid formation which occurs during the simultaneous heating and steam sparging operations of this process is well established and understood, but has not been previously utilized for the purpose of completely eliminating the Halphen-test response from cottonseed oils.

(3) The third process by which we inactivate the cyclopropene components of refined and bleached Halphen-positive cottonseed oil consists of prolonged deodorization utilizing processing conditions as follows: Typically, refined and bleached Halphen-positive cottonseed oil is heated to conventional deodorizing temperatures (preferably about from 400° to 500° F.) in a batch-type, pilot-plant, deodorizer, while steam sparging (preferably about from 3 to 5 pounds of steam per hour per 100 pounds of oil) under a reduced pressure of about 3 mm. of mercury. These processing conditions are maintained until a sample aliquot of oil yields a negative response to the Halphen test, AOCS Official Method Cb 1-25. "Official and Tentative Methods of Analysis," 2nd. rev. to 1963, Chicago. The Halphen-negative cottonseed oil so produced is devoid of residual odors and flavors and has an acidity below that of the original oil used as starting material.

As will be appreciated by those versed in the art of vegetable oil processing, under conventional deodorization conditions of heating, steam sparging, and high vacuum as described above, an equilibrium state is developed wherein the fatty acids are removed from the oil by steam distillation almost as rapidly as they are formed, hence a somewhat longer processing time is required to completely inactivate the cyclopropenes present in the oil. Although this increased processing time results in formation and loss of somewhat larger quantities of fatty acids from the oil being processed, the method does nevertheless completely inactivate the cyclopropenes present and results in an oil which reacts negatively to the Halphen test.

The precise purpose of these processes which constitute this invention therefore, is to provide simple and practical methods for completely eliminating the Halphen-test response from cottonseed oil just prior to, or in conjunction with the deodorization process. The specific effectiveness of each method derives from heating refined and bleached cottonseed oil in the presence of cottonseed fatty acids, which may be introduced as an additive component prior to treatment, or developed in situ by carefully controlled processing conditions.

It is our opinion that the carboxyl group of the fatty acids, added to or produced in the oils in process, reacts with the cyclopropenoid responsible for the Halphen-test response, and thus renders it inactive. Although we are by no means certain that this is the mechanism of our process, inability to explain the reaction in no way detracts from the efficacy of the processes. We are able to demonstrate by chemical tests the complete elimination of Halphen-test response in cottonseed oils treated by our processes.

The AOCS Halphen-test (Official Method Cb 1-25) was used for measuring the Halphen-test response, of the oils cited in our examples, and the cyclopropene acid concentrations of these oils were determined by the step-wise HBr titration method described by Harris et al., Journal of the American Oil Chemists' Society, 41, 309-311 (1964).

While specific reaction times, reaction temperatures and steam sparge flow rates have been outlined in the examples which follow, these precise conditions are not to be construed as the only operable combinations of our processes for effectively eliminating the Halphen-test response from refined and bleached cottonseed oils. By increasing cottonseed fatty acid additions or steam sparging rates, reduced reaction times may be employed. Similarly, by changing other variables such as temperature and pressure, oils of enhanced quality may be produced.

The cottonseed oil used in all of the experimental tests cited as examples was withdrawn from the "in process" oil stream of a commercial vegetable oil refinery and had been refined by treatment with caustic soda and subsequently bleached by treatment with fullers earth but had not been deodorized. This oil gave a strong positive response to the Halphen test and analyzed as containing 0.07% of free fatty acids (as oleic acid) and 0.57% cyclopropenoids (as malvalic acid).

All experiments were carried out in a 60 gallon capacity all-iron deodorizer vessel equipped for operation at controlled conditions of vacuum and temperature and with provision for injection of 30 p.s.i.g. saturated steam at precisely metered rates into the oil through a steam distributor located near the bottom of the vessel.

*Example 1*

*With added free fatty acids.*—A mixture consisting of 401.5 pounds of the undeodorized refined and bleached cottonseed oil and 9 pounds of distilled cottonseed oil fatty acids was prepared and charged to the deodorizer vessel. The deodorizer vessel was then evacuated to a vacuum of about 22 inches of mercury (absolute pressure, 200 mm. mercury) and the cottonseed oil fatty acid mixture heated from an initial temperature of about 70°–80° F. (21°–26° C.) to 200° F. (93.3° C.) while under vacuum. When the temperature of the oil fatty acids mixture had reached 200° F. injection of 30 p.s.i. saturated steam at a rate of 0.7 pound per hour per 100 pounds of oil fatty acids mixture was begun. Heating of the oil fatty acids mixture was continued, with continuous injection of steam at the same rate and while maintaining about 22 inches of mercury vacuum in the vessel, for 2 hours and 35 minutes, at which time the temperature of the oil-fatty acids mixture had reached 450° F. (232° C.). At this time the vacuum in the vessel was increased to 29.6 inches of mercury (4 mm. mercury absolute pressure) and the steam injection rate was increased to 4 pounds per hour per 100 pounds of oil. These conditions of vacuum (29.6 in. Hg absolute pressure) and steam injection rate (4 pounds per hour per 100 pounds oil) were continued for 2 hours and 25 minutes while maintaining the temperature of the oil between 445° F. and 455° F. At the end of this period steam injection was discontinued, the oil was cooled to about 175° F., the vacuum broken and the oil was discharged from the vessel. Samples of the oil fatty acid mixture were taken at intervals throughout the treatment and analyzed for Halphen-test response, malvalic acid content, and free fatty acids content. The data in Table I show the results obtained.

TABLE I

| Elapsed time from start of steam injection, Hrs.:Min. | Temp. of Oil, °F. | Halphen-test response of oil | Cyclopropenoid in oil, percent | Free fatty acid in oil, percent |
|---|---|---|---|---|
| 0:00 | 110 | Strong | 0.57 | 2.13 |
| 0:21 | 200 | ----do---- | | 2.01 |
| 0:33 | 315 | Positive | | |
| 0:53 | 347 | ----do---- | | 2.01 |
| 1:23 | 388 | ----do---- | | 1.82 |
| 1:53 | 410 | Slight positive | | 1.76 |
| 2:23 | 435 | Negative | 0.016 | 2.10 |
| 2:53 | 445 | ----do---- | | 2.30 |
| 2:58 | 450 | ----do---- | | |
| 3:23 | 458 | ----do---- | 0.00 | 0.08 |
| 3:53 | 445 | ----do---- | | 0.08 |
| 4:23 | 445 | ----do---- | | 0.08 |
| 4:53 | 445 | ----do---- | | 0.06 |
| 5:23 | 445 | ----do---- | | 0.05 |

Example 2

*Without added free fatty acids.*—A charge of 337 pounds of the same lot of undeodorized refined and bleached cottonseed oil as used in Example 1 was drawn into the evacuated deodorizer vessel. With the vessel under a vacuum of about 19.5 inches of mercury (265 mm. Hg absolute pressure) the oil was heated to a temperature of 210° F. (98.9° C.) and injection of 30 p.s.i. saturated steam at a rate of 0.7 pounds of steam per hour per 100 pounds of oil was begun. Heating of the oil was continued while maintaining the oil under about 19 to 20 inches of mercury vacuum and while continuing steam injection at the 0.7 pounds per hour per 100 pounds of oil rate until the temperature of the oil had reached 452° F. (233.3° C.), the time required for heating the oil from 210° F. to 452° F. being 1 hour and 55 minutes. When the temperature of the oil had reached 452° F. treatment was continued, with the vacuum and steam rate the same as before but with the temperature held constant at 452° F. to 455° F., for an additional time of 45 minutes. At the end of this period the vacuum was increased to 29.6 inches of mercury (4.0 mm. Hg absolute pressure), the steam injection rate was increased to 4.7 pounds per hour per 100 pounds of oil and treatment was continued for an additional 2 hours while maintaining the temperature of the oil at from 450° F. to 455° F. At the end of this period steam injection was stopped, the oil was cooled to about 175° F., the vacuum broken, and the oil discharged from the deodorizer. The data in Table II show the Halphen-test response, the malvalic acid content, and the free fatty acids content of samples of the oil taken at intervals throughout the treatment.

TABLE II

| Elapsed time from start of steam injection, Hrs.:Mins. | Temp. of oil, °F. | Halphen test response of oil | Cyclopropenoids in oil, percent | Free fatty acids in oil (as oleic), percent |
|---|---|---|---|---|
| 0:00 | 115 | Strong pos | 0.57 | 0.08 |
| 0:30 | 220 | do | 0.57 | 0.08 |
| 0:45 | 345 | | | 0.08 |
| 1:15 | 393 | | | |
| 1:45 | 420 | Strong pos | 0.40 | 0.06 |
| 2:15 | 447 | Positive | 0.07 | 0.10 |
| 2:45 | 448 | do | 0.04 | 0.16 |
| 3:15 | 455 | Negative | 0.01 | 0.30 |
| 3:45 | 450 | do | | 0.06 |
| 4:15 | 452 | do | 0.01 | 0.04 |
| 5:15 | 453 | do | | 0.02 |

Example 3

*Without added free fatty acids.*—A charge of 328 pounds of the same lot of cottonseed oil as was used for Examples 1 and 2 was drawn into the deodorizer vessel, placed under 29.8 inches of mercury vacuum (2–3 mm. Hg absolute pressure), and heating begun. When the oil had reached 210° F. (99° C.) injection of steam at the rate of 4.9 pounds of steam per 100 pounds of oil was begun. The oil was heated in 2 hours and 40 minutes to 452° F. (233.3° C.) and was maintained at this temperature for an additional 2 hours and 20 minutes, with the vacuum being maintained constant at 29.8 inches of mercury and the steam injection rate being maintained at 4.9 pounds per hour per 100 pounds of oil throughout the heating period. At the end of the heating period injection of steam was stopped, the oil cooled to 180° F. (82° C.), the vacuum broken and the oil discharged.

The data in Table III show the Halphen-test response of the oil, its malvalic acid content, and its free fatty acids content, as determined in samples taken at intervals throughout the treatment.

TABLE III

| Elapsed time from start of team injection, Hrs.:Mins. | Temp. of oil, °F. | Halphen test response of oil | Cyclopropenoids in oil, percent | Free fatty acids in oil (as oleic), percent |
|---|---|---|---|---|
| 0:00 | 210 | Strong pos | 0.57 | 0.08 |
| 0:40 | 345 | do | | 0.05 |
| 1:10 | 380 | do | | 0.05 |
| 1:40 | 410 | do | 0.40 | 0.04 |
| 2:10 | 435 | Positive | | 0.03 |
| 2:30 | 450 | do | | |
| 2:40 | 452 | do | | 0.03 |
| 3:10 | 451 | do | 0.06 | |
| 3:40 | 451 | Very slight pos | 0.02 | |
| 4:10 | 451 | Negative | 0.01 | |
| 4:40 | 452 | do | | |
| 5:00 | 452 | do | | |

We claim:

1. A process for removing positive Halphen-test response from a refined and bleached cottonseed oil containing cyclopropenoids, which comprises heating and steam sparging the cottonseed oil at a temperature of about from 400° to 500° F. and at a reduced pressure of at least about 100 mm. of mercury until the Halphen response of the cottonseed oil being treated becomes negative by test.

2. A process for removing positive Halphen test response from a refined and bleached cottonseed oil containing cyclopropenoids, which comprises heating and steam sparging the cottonseed oil at a temperature of about from 400° to 500° F. and at a reduced pressure of at least about 100 mm. of mercury and in the presence of cottonseed oil fatty acids which are present in a molar excess relative to the cottonseed oil cyclopropenoids, until the Halphen response of the cottonseed oil being treated becomes negative by test.

References Cited

Rayner et al.: Journal of the American Oil Chemists' Society, vol. 43, (1966), pages 113–115.

HENRY R. JILES, *Primary Examiner.*

A. M. TIGHE, *Assistant Examiner.*